V. & S. RILEY.
DETACHABLE WHEEL.
APPLICATION FILED OCT. 6, 1913.
1,088,627.
Patented Feb. 24, 1914.
4 SHEETS—SHEET 2.
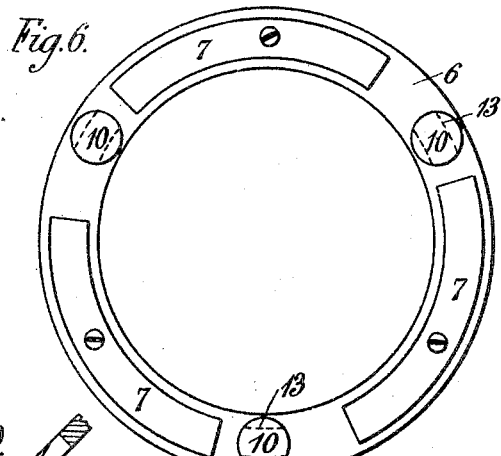
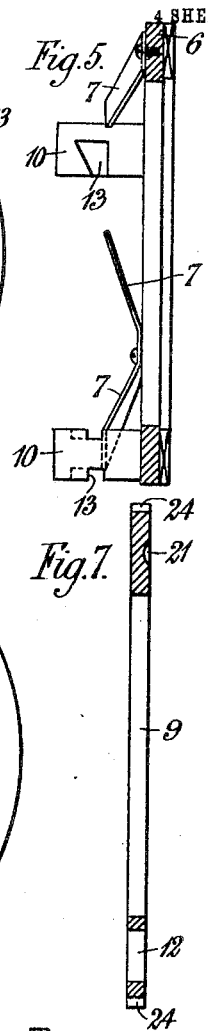
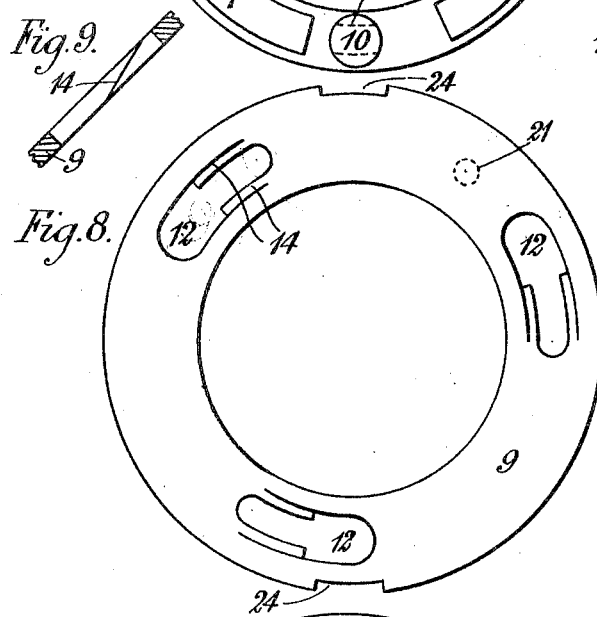
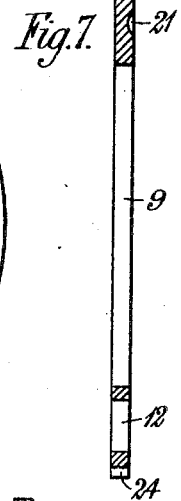
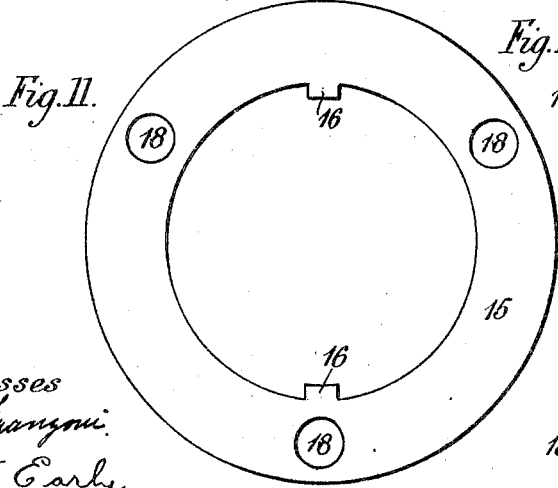
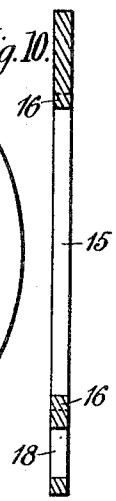
Witnesses
E. B. Franzoni
C. F. Early
Inventors
Victor Riley
Stanley Riley
by their attorney
Baldwin Wight

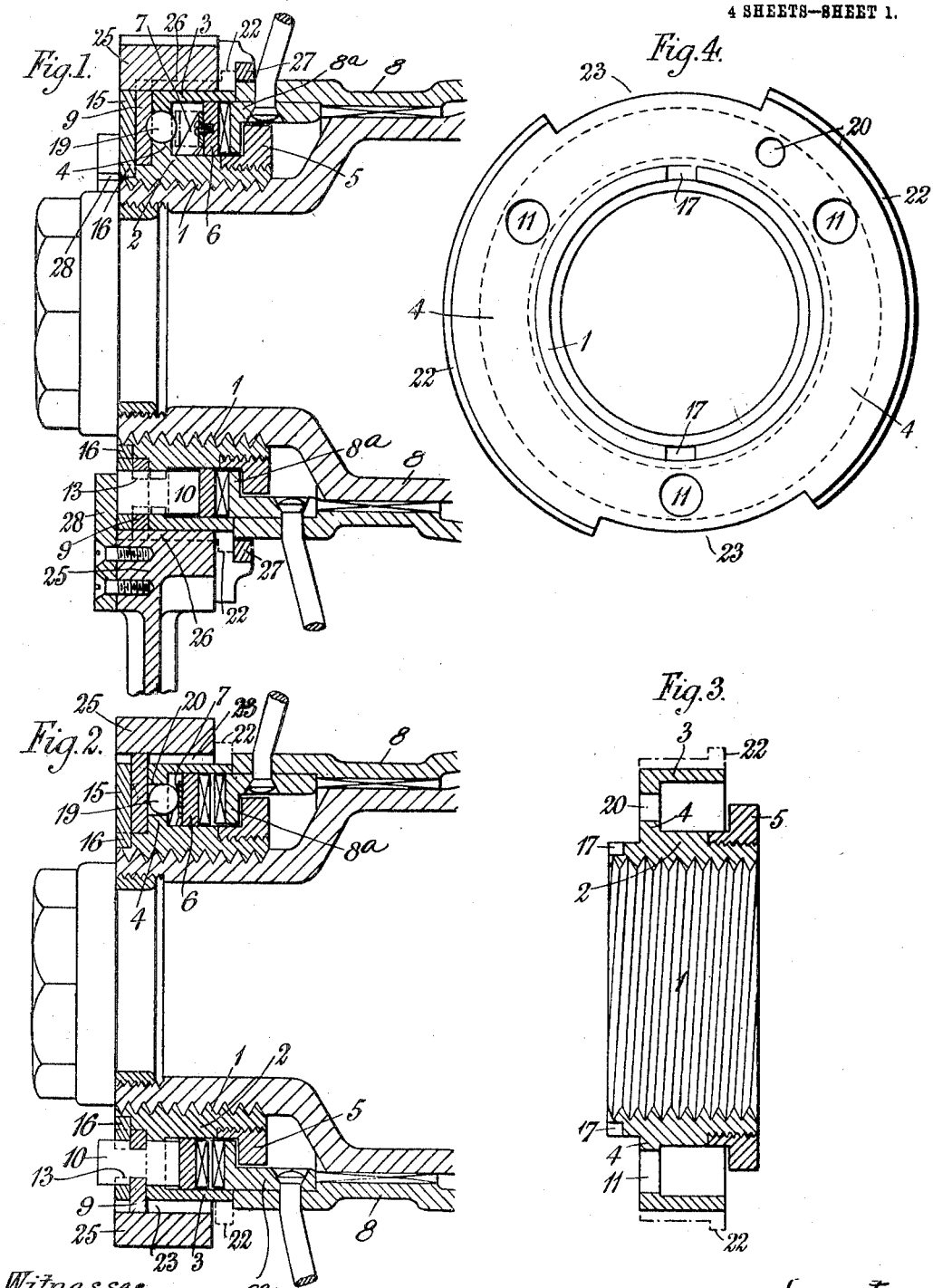

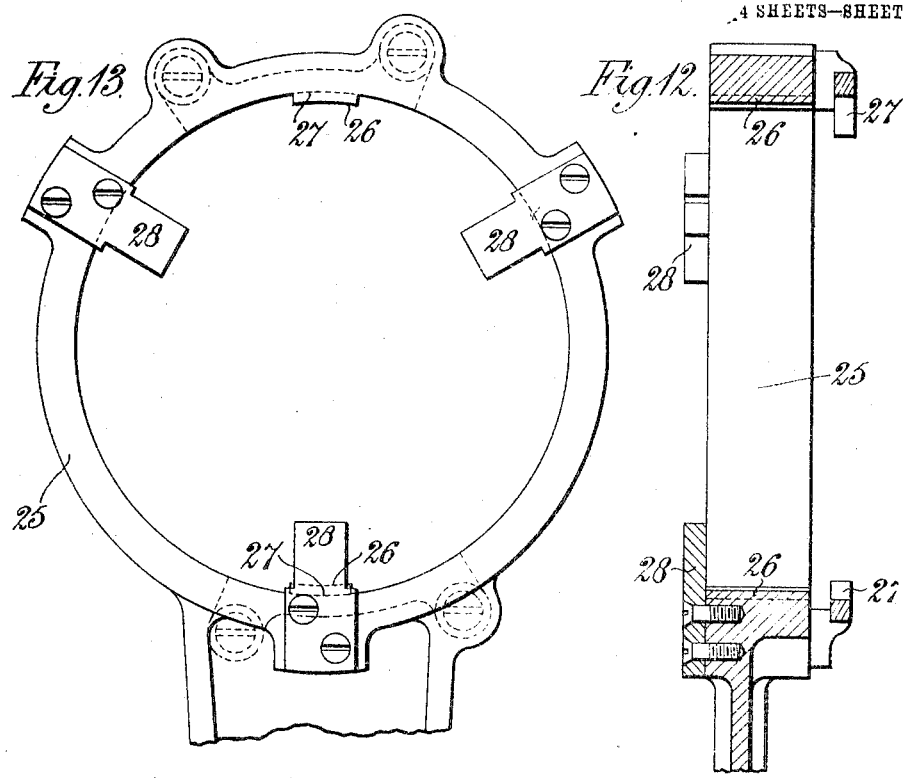
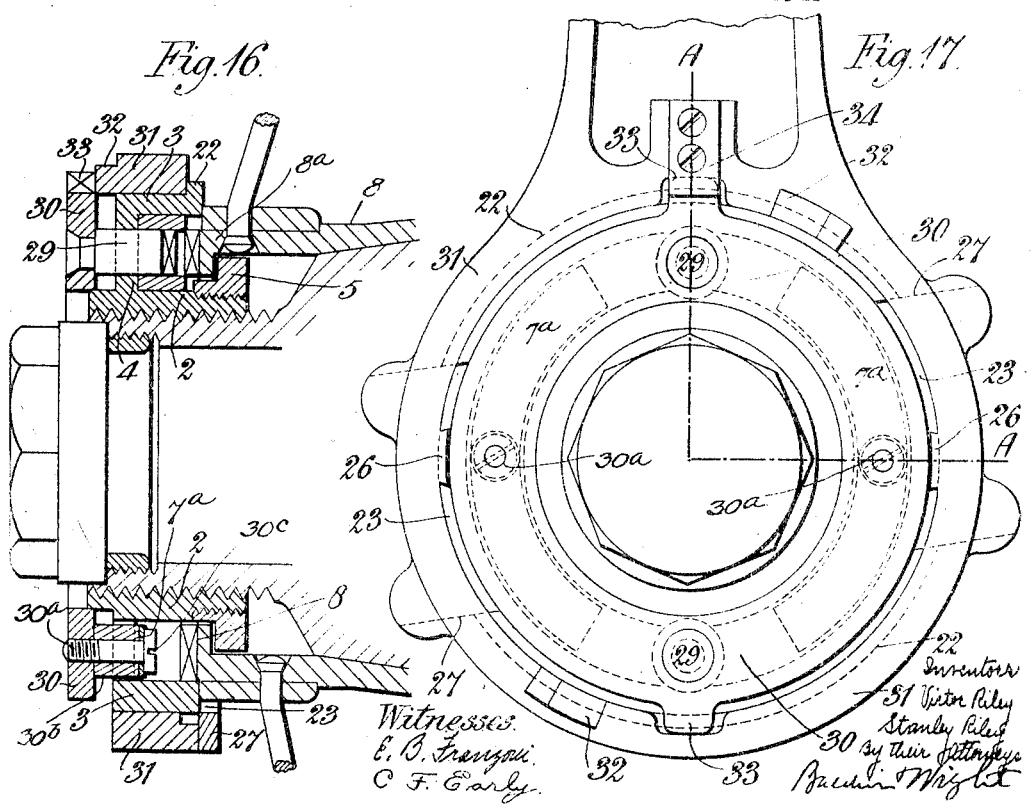

V. & S. RILEY.
DETACHABLE WHEEL.
APPLICATION FILED OCT. 6, 1913.
1,088,627.
Patented Feb. 24, 1914.
4 SHEETS—SHEET 4.
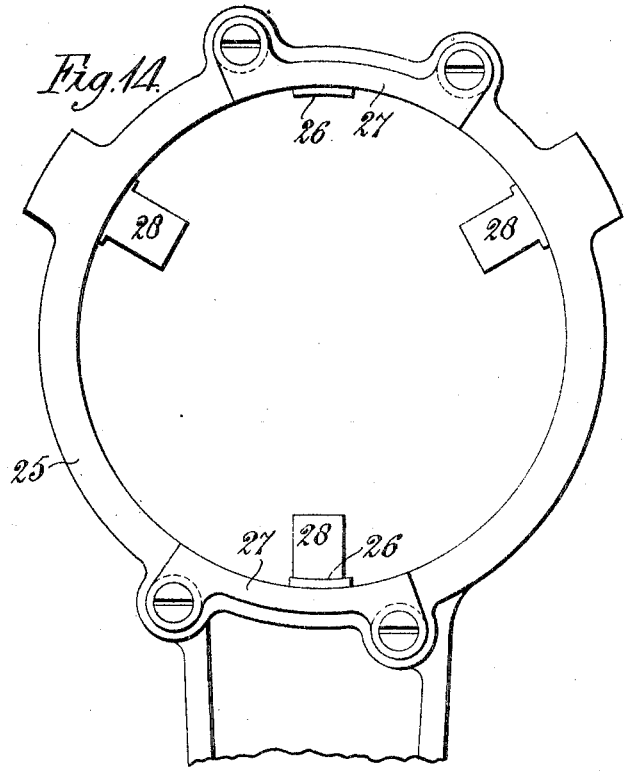
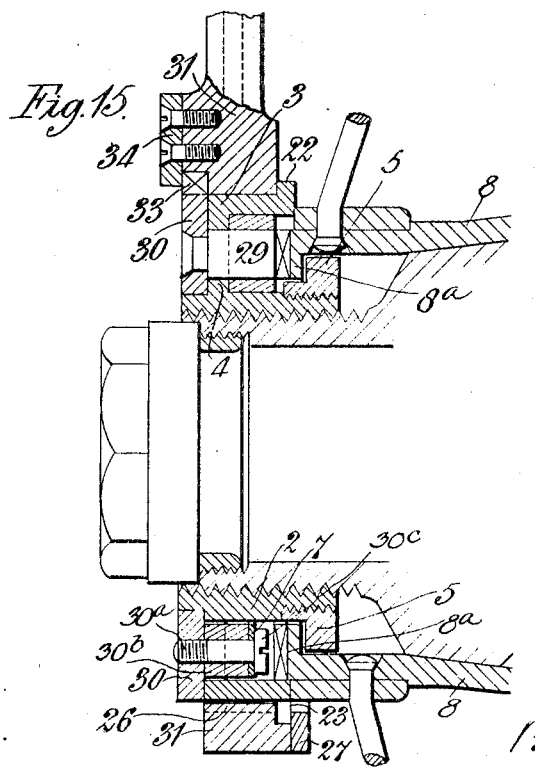
Witnesses
C. B. Franzoni
C. F. Early
Inventors
Victor Riley
Stanley Riley

UNITED STATES PATENT OFFICE.

VICTOR RILEY AND STANLEY RILEY, OF COVENTRY, ENGLAND.

DETACHABLE WHEEL.

1,088,627.  Specification of Letters Patent.  Patented Feb. 24, 1914.

Application filed October 6, 1913. Serial No. 793,606.

*To all whom it may concern:*

Be it known that we, VICTOR RILEY and STANLEY RILEY, subjects of the King of Great Britain, both residing at Hollybank, Radford Road, Coventry, England, have invented new and useful Improvements in Detachable Wheels, of which the following is a specification.

This invention relates to the means for securing detachable wheels on their hubs. Such wheels are commonly secured by a nut or ring which screws onto a thread cut on the outer end of the inner or permanent hub and bears against the outer end of the detachable hub while locking means such as a toothed ring or pawls carried by the nut engage teeth on the detachable hub and so prevent the nut from becoming unscrewed.

The objects of the invention are to provide novel devices for insuring the disengaging of the locking means before the nut is turned thereby avoiding all possible damage to the locking means and for making it impossible when the nut is nearly screwed home, to remove from the nut the spanner which operates it until the locking means are completely in engagement.

In the drawings which illustrate the invention Figure 1 is a section showing the nut with the spanner placed in position on it the toothed locking ring being in engagement with the hub shell; Fig. 2 is a similar section with the locking ring disengaged from the hub shell; Fig. 3 is a section of the nut; Fig. 4 an end elevation thereof; Fig. 5 is a section of the locking ring; Fig. 6 an elevation thereof; Fig. 7 is a section of the claw plate; Fig. 8 an elevation thereof; Fig. 9 is a detail view in section showing the inclines on the claw plate; Fig. 10 is a section of the cover plate, and Fig. 11 an elevation thereof; Fig. 12 is a section and Figs. 13 and 14 a face and rear view of the spanner; Fig. 15 is a section on the line A—A, Fig. 17, of a modification showing the locking pawl engaged; Fig. 16 is a similar section showing the locking pawl disengaged; and Fig. 17 is a face view of the spanner placed in position on the locking nut.

The nut 1 consists of two co-axial cylinders, an inner cylinder 2 and an outer cylinder 3, connected together by a flange 4 near their outer ends and carries as is usual a draw-off ring 5. This ring is screwed on to a left hand screw thread around the inner end of the cylinder 2. Fitting on to the cylinder 2 between the flange 4 and the draw off ring 5 is a toothed locking ring 6 which engages with teeth cut on a collar 8$^a$ forming part of the detachable hub or hub shell 8; the two sets of teeth being forced into engagement with each other by springs 7 lying between the ring 6 and the flange 4. Surrounding the inner cylinder 2 on the outer side of the flange is a claw plate 9.

The toothed locking ring 6 has projecting from its outer face pins 10 which pass through holes 11 in the flange 4 of the nut 1 and through slots 12 in the claw plate 9. The pins 10 have notches 13 (Fig. 5) cut in them which engage with inclines 14 (Figs. 8 and 9) on the claw plate so that when the latter is turned relatively to the locking ring 6 the pins 10 and with them the locking ring 6 are drawn outward thus compressing the springs 7 and disengaging the teeth of the ring 6 from the teeth of the hub shell. Thus the ring 6 and the nut 1 turn together while the nut and claw plate have a limited movement relatively to each other. It will be observed by reference to Fig. 8 that the slots 12 are considerably longer than the diameter of the pins which admit of this relative movement. Normally, or when the locking ring is engaged with the hub shell the pins 10 extend through portions of the slots which are not provided with the inclines 14 and said portions of the slots are somewhat longer than the diameter of the pins 10. A cover plate 15 is preferably provided on the outer side of the claw plate 9. This cover plate 15 has holes 18 to steady the pins 10 which project from the toothed locking ring 6 and the cover plate gives a smooth outside face to the nut 1. It is prevented from movement relative to the nut 1 by two tongues 16 formed in its bore and fitting into two corresponding slots 17 in the nut.

The claw plate 9 is normally locked in one position relatively to the nut 1 and locking ring 6 by means of a spring pressed ball 19 which lies in a hole 20 in the flange 4 and engages with a recess 21 in the claw plate 9. The ball 19 normally holds the claw plate in place preventing accidental movement of said plate relatively to the ring 6 when the parts are in locked position, but the ball is readily dislodged from its socket 20 when the claw plate is operated by the spanner. Without some such device the claw plate might have to be shifted by hand in order to bring it into proper position to enable the spanner to be put on or taken off. The inner end of the outer cylinder 3 has a flange 22, projecting radially from it, the diameter of this flange being greater than that of the claw plate 9. Wide notches 23 are cut the whole length of the outer cylinder 3 (including its flange) and the diameter at the bottom of these notches is the same as the diameter at the bottom of narrow notches 24 in the claw plate 9. The body of the spanner 25 is cylindrical in form, its internal diameter being such that it can pass over the outer cylinder 3 of the nut 1 and the claw plate 9. Inside it are keys 26 adapted to engage with the notches 23 of the nut and the notches 24 of the claw plate and fitting the narrow notches 24 in the claw plate 9. At one end of the cylindrical body are fixed segmental flanges 27 the internal diameter of which is sufficiently large to enable them to be passed over the claw plate 9, but not large enough to pass the flange 22 of the cylinder 3 of the nut 1 except at the wide notches 23 in which they are a close fit. At the other side of the cylindrical body of the spanner 25 are inwardly projecting plates 28 which come upon the ends of the pins 10 of the locking ring 6.

When the spanner 25 is applied, the flanges 27 pass through the notches 23 in the flange 22 of the nut and the keys 26 of the spanner pass into the notches 23 of the nut and the notches 24 of the claw plate, and when the spanner is turned in either direction the flanges 27 come behind the flange 22 of the nut and the spanner cannot be withdrawn when the parts are in this position. Such removal of the spanner can only take place when the latter is turned back again until the flanges 27 thereof come into line with the notches 23 of the nut flange 22 at which time the keys 26 of the spanner are also in line with the notches 23 and 24.

Assuming that the wheel is placed on the permanent hub and locked thereto and it is desired to unfix the wheel or remove it from the permanent hub, the spanner is applied to the nut, the notches 24 and 23 being in line and permitting the flanges 27 to pass into a vertical plane behind the nut with the keys 26 in the notches 24 and 23. The spanner is then turned to the left. Inasmuch as the keys 26 fit closely in the notches 24 and loosely in the notches 23, the claw plate is first moved relatively to the locking plate 6 and to the nut. This movement of the spanner causes the plates 28 carried thereby to be withdrawn from the outer end of the pins 10 of the locking ring, then the claws or inclines on the claw plate engage the pins 10 and move them outward causing the locking plate 6 to separate from the detachable hub. This is done before the nut is turned and thus any strain on the teeth is avoided. By the continued movement of the spanner to the left the nut may be unscrewed and the wheel withdrawn. The spanner may be left on the nut or it may be removed therefrom by holding the nut and turning the spanner a short distance to the right until the flanges 28 come into line with the notches 23.

To replace the wheel, assuming that the spanner is removed, the nut is first applied to the permanent hub and the spanner is placed on the nut, the flanges 27 passing through the notches 23 in the flange 22 of the nut and the keys 26 entering the notches 24 and 23. If now the spanner be turned to the right, the flanges 27 of the spanner will pass behind the flanges 22 of the nut, and when in this position the spanner cannot be withdrawn. At this time the pins 10 do not project from the nut and if the movement of the spanner to the right be continued the nut will be screwed home, the teeth on the ring 6 being made to engage the teeth on the hub shell.

When the nut is nearly screwed home, the teeth on the toothed ring chatter over the teeth on the hub shell, the pins 10 being alternately projected and withdrawn at the outer end of the hub. If the movement be continued until the teeth on the ring are completely engaged with the teeth on the hub shell, the parts will be securely locked and at that time the pins do not project from the outer end of the hub and the spanner may be turned a short distance in reverse direction, i. e., to the left until the flanges 27 come into line with the notches 23 of the hub flange 22, then the spanner may be withdrawn. But if the teeth of the ring 6 touch the teeth of the detachable hub, the engagement of the teeth is not complete, e. g., if the ends of the teeth merely engage each other the pins 10 will project from the outer end of the hub and if it be attempted to move the spanner in the reverse direction, i. e., to the left, the pins being now in the path of the plates 28 will prevent a sufficient movement to bring the flanges 27 into line with the notches 23 and hence the spanner cannot be withdrawn from the nut. It is first necessary to turn the nut to a greater extent to the right until the teeth are completely engaged so that the pins 10 will not project, and then the spanner can be turned back to bring its flanges 27 into line with the notches 23 so that the spanner can be easily removed.

It will be observed that these operations are automatic, that is to say, in removing or unfixing the wheel, the teeth of the locking device are first withdrawn from engagement with the hub shell when the spanner is first moved and in screwing on the nut a rigid part of the locking device projects into the path of a rigid part of the spanner when the teeth of the locking device and the hub shell are only partially engaged and this prevents the removal of the spanner from the nut.

It is not necessary as in some prior constructions to operate or adjust some device by the hand in order to effect these results. The locking device shown in Fig. 1 is in effect a pawl with an extended toothed surface and with a plurality of pins or projecting parts which are made rigid with the toothed surface. One or more independent pawls may be employed if desired.

In the form of invention shown in Figs. 15, 16 and 17 the claw plate is omitted but the nut 1 is of the kind shown in Fig. 3 being provided with wide notches 23 (Fig. 17) formed in the part 3 of the nut as well as in the flange 23. Pins or pawls 29 are rigidly secured to a ring or cover plate 30 which moves in and out with them. The plate 30 is attached to bolts 30ª extending through thimbles 30ᵇ in the nut and springs 7ª engage the heads 30ᶜ of the bolts and tend to draw the cover plate inward and to cause the pawls 29 to engage the teeth of the hub shell. The cover plate 30 carries lugs 33 having inclined ends as shown for the purpose presently explained.

The spanner 25 is adapted to fit over the nut and it is formed with keys 26 similar to those before described which enter the relatively wide notches 23 in the part 3 of the nut and in its flange 22. The spanner is, as before described, formed with segmental flanges 27 which operate in the manner before specified, i. e., these flanges when the spanner is being applied pass through the notches 23 of the hub and its flange, and when the spanner is turned in either direction the flanges 27 come behind the flange 22 and the spanner cannot be withdrawn. The spanner carries on its front face plates 34 which, as shown in Fig. 17, at times are disposed in front of the lugs 33. The spanner also carries lugs 32 having inclined ends which are adapted to engage the lugs 33. Assuming that the wheel is fixed to the permanent hub and it is desired to withdraw it or unfix it, the spanner is applied in the manner before described and is turned to the left. The plates 34 uncover the lugs 33 and the lugs 32 enter behind the lugs 33 and cause the cover plate 30 with the pawls 29 to be moved outward against the tension of the springs 7ª. By this movement the pawls are disengaged from the hub shell and by continued movement to the left the wheel may be withdrawn.

To replace the wheel the nut is applied to the permanent hub and the spanner is applied to the nut, the notches 23 at this time permitting the flanges 27 to pass to a vertical plane behind the flange 22 of the nut, then if the spanner be turned to the right the flanges 27 will come behind the flange 22 and the spanner cannot at this time be removed from the nut. By turning the spanner a sufficient number of times the nut is screwed on and the toothed pawls chatter over the teeth of the permanent hub and if the nut be sufficiently turned the pawls and the hub will be completely engaged. If the pawls are not completely engaged with the hub shell, the cover plate 30 will be projected from the front end of the nut and the lugs 33 will lie in the path of the plates 34 and will prevent the spanner from being turned on the nut sufficiently to cause the flanges 27 to come into line with the notches 23. It will first be necessary to turn the spanner to the right sufficiently to cause the pawls to completely engage the teeth of the detachable hub, after which the spanner may be turned backward or to the left sufficiently to permit it to be withdrawn. In this case also a part rigidly connected with the pawls is made to come into the path of a part rigidly connected with the spanner to prevent the premature withdrawal of the spanner.

We claim as our invention:

1. The combination of a permanent hub, a detachable hub shell, a nut having a threaded engagement with the permanent hub, a locking device carried by the nut and adapted to engage the shell, a spanner having means for preventing its removal from the nut while being operated to turn the latter in either direction and having also a rigidly connected part adapted to engage a part rigid with the locking device when the locking device comes into incomplete engagement with the hub shell and thus prevent the turning of the spanner to withdrawing position until said locking device is fully engaged with said hub shell.

2. The combination of a permanent hub, a detachable hub shell provided with an annular series of teeth, a nut having a threaded engagement with the permanent hub, a locking device carried by the nut adapted to move in a direction parallel to the axis of the nut and to engage the hub shell, a spanner having means for preventing its removal from the nut while being operated to turn the latter and having also a rigidly connected part adapted to engage a part rigid with the locking device when the locking device has incomplete engagement with the hub shell and thus prevent the turning of the spanner to withdrawing position until said locking device is fully engaged with said hub shell.

3. The combination of a permanent hub, a detachable hub shell, a nut having a threaded engagement with the permanent hub and which is formed with a notched flange at its inner end, a locking device carried by the nut movable in a direction parallel to the axis of the nut and adapted to engage the hub shell, a spanner having a flange adapted to pass through the notch in the flange of the nut and to enter behind said flange and having also a rigidly connected part adapted to engage a part rigid with the locking device when the locking device incompletely engages the hub shell and thus prevent the turning of the spanner to withdrawing position until said locking device is fully engaged with said hub shell.

4. The combination of a permanent hub, a detachable hub shell, a nut having a threaded engagement with the permanent hub, a locking device carried by the nut adapted to engage the shell, a lug projecting radially from the locking device, a spanner having means for preventing its removal from the nut while being operated to turn the latter and having also an inclined lug adapted to engage the lug on the locking device to cause the latter to separate from the detachable hub and having also a rigidly connected part adapted to engage the lug on the locking device when said locking device projects in its path and incompletely engages the hub shell whereby the spanner is prevented from moving to withdrawing position when said locking device is projected to hold said lug in its path.

5. The combination of a hub shell having locking teeth, a nut adapted to engage a permanent hub, a locking device carried by the nut adapted to move in a direction parallel to the axis of the nut and to engage the hub shell, means on the nut adapted to engage a spanner to prevent the removal of the spanner endwise therefrom, means on the nut adapted to engage the spanner to cause the withdrawal of the locking device from the detachable hub when unfixing the hub and which projects into the path of the spanner and is adapted to engage a rigid part thereof to prevent said spanner from being turned to withdrawing position when said locking device incompletely engages the hub shell.

6. The combination of a hub shell provided with locking teeth, a nut concentric with the hub shell, a locking device carried by the nut movable endwise thereon and adapted to engage the hub shell, a spanner engaging device rigid with the locking device, a spanner provided with means engaging the nut to prevent the removal of the spanner therefrom while the nut is being turned and provided also with rigidly connected means for engaging said spanner-engaging device on the locking device to move said locking device out of engagement with the hub shell and also with rigidly connected means adapted to engage said spanner-engaging device to prevent the spanner from being turned to withdrawing position when the locking device is incompletely engaged with the hub shell and until said locking device is fully engaged therewith.

VICTOR RILEY.
STANLEY RILEY.

Witnesses to the signature of Victor Riley:
 HERBERT D. JAMESON,
 W. E. ROGERS.

Witnesses to the signature of Stanley Riley:
 FRED J. PEARY,
 A. R. LOAVS.

Copies of this patent may be obtained for five cents each, by addressing the "Commissioner of Patents, Washington, D. C."